United States Patent
Nass et al.

(10) Patent No.: US 6,218,646 B1
(45) Date of Patent: Apr. 17, 2001

(54) METHOD FOR ADJUSTING A LIMITING VALUE OF AN OPERATING TEMPERATURE OF A COOKING UNIT AND DEVICE FOR PERFORMING SAID METHOD

(75) Inventors: Peter Nass, Mainz; Harry Engelmann, Ingelheim; Roland Dudek, Bad Kreuznach; Kurt Schaupert, Hofheim, all of (DE)

(73) Assignee: Schott Glas, Mainz (DE)

( * ) Notice: Subject to any disclaimer, the term of this patent is extended or adjusted under 35 U.S.C. 154(b) by 0 days.

(21) Appl. No.: 09/432,955

(22) Filed: Nov. 3, 1999

(30) Foreign Application Priority Data

Nov. 5, 1998 (DE) ................................. 198 51 029

(51) Int. Cl.$^7$ ........................................................ H05B 1/02
(52) U.S. Cl. ................... 219/497; 219/449; 219/448.11; 219/492; 219/494; 219/459
(58) Field of Search ................................. 219/508, 497, 219/464, 449, 483, 446.1, 485, 494, 448.11, 459, 460.1, 461.1, 492; 250/338.1, 339.03

(56) References Cited

U.S. PATENT DOCUMENTS

| 4,740,664 | * | 4/1988 | Payne et al. | 219/449 |
| 4,816,647 | * | 3/1989 | Payne | 219/464 |
| 5,041,809 | * | 8/1991 | Payne et al. | 338/25 |
| 5,961,867 | * | 10/1999 | McWilliams | 219/446.1 |
| 6,111,228 | * | 8/2000 | Berkcan et al. | 219/446.1 |
| 6,118,105 | * | 9/2000 | Berkcan et al. . | |

FOREIGN PATENT DOCUMENTS

| 37 36 005 A1 | 5/1989 | (DE) . |
| 40 22 846 C2 | 8/1994 | (DE) . |
| 37 39 943 C2 | 2/1997 | (DE) . |

* cited by examiner

Primary Examiner—Teresa Walberg
Assistant Examiner—Jeffrey C Pwu
(74) Attorney, Agent, or Firm—Michael J. Striker

(57) ABSTRACT

Glass or glass-ceramic materials for a cooking surface of a modern cooking unit can only withstand a certain predetermined limited temperature/time load. In order to guarantee that the permissible temperature/time load is not exceeded during the guaranteed lifetime at a given "standard" usage frequency, a shut-off temperature must be determined by an operating temperature limiting device provided in the cooking unit. So that the full potential of the cooking unit in regard to the load that the cooking surface bears can be attained when the actual usage frequency is less than a nominal value or predetermined guideline, the method provides for a continuous measurement of the accumulated temperature/time load and for continuous determination of the shut-off temperature by comparison of the accumulated temperature/time load with the permissible load for the actual usage duration.

16 Claims, 4 Drawing Sheets

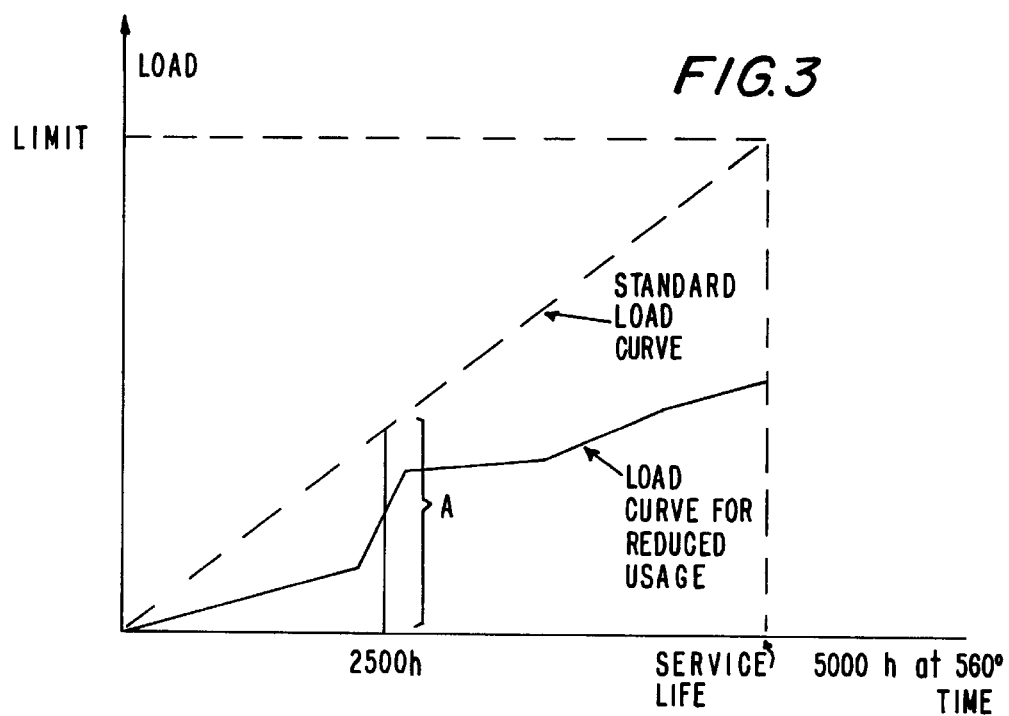
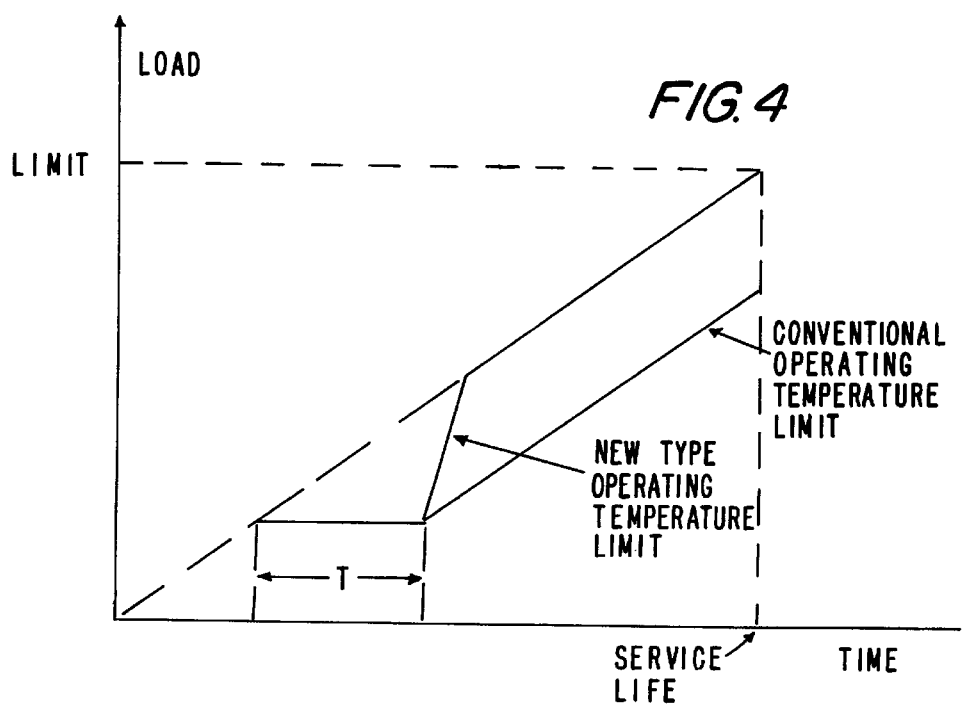

METHOD FOR ADJUSTING A LIMITING VALUE OF AN OPERATING TEMPERATURE OF A COOKING UNIT AND DEVICE FOR PERFORMING SAID METHOD

BACKGROUND OF THE INVENTION

1. Field of the Invention

The present invention relates to a method of adjusting a limiting value of an operating temperature of a cooking unit, which has a glass or glass-ceramic cooking surface with at least one heated cooking zone. The invention also relates to a device for performing the method.

2. Prior Art

The glass-ceramic material for a modern cooking unit with a glass-ceramic cooking surface is made by a temperature/time treatment of a special glass. Among other things, the thermal expansion behavior is adjusted for the application. If impermissibly high temperature/time loads occur in usage, among other things, the reduced thermal expansion behavior is lost and, in extreme cases, the glass-ceramic material can fail or break.

Analogously this is also true for a cooking unit, which uses thermally or chemically pre-stressed glass. At a high operating temperature this leads to a loss of the pre-stressing, which can lead to destruction of the product.

In cooking units of the above-described kind according to the state of the art temperature monitoring of the glass/glass-ceramic cooking surface is provided by means of an operating temperature limiting device, which is adjusted so that the permissible temperature/time load on the glass/glass-ceramic cooking surface during the required operating life at a nominal operating frequency is not exceeded. A guideline or directive for the operating frequency has been published in German Standard DIN VDE 0700, Part 6, Appendix 8.

A mechanical operating temperature limiting device with a solid expansion controller is known. Also an electronic operating temperature limiting device is known. A conductor strip directly mounted on the cooking surface (as in DE 40 22 846 C2) or a discrete platinum temperature-measuring resistor (as in DE 37 36 005 A1) can be used as a sensor for this electronic operating temperature limiting device. However these electronic operating temperature limiting devices according to the state of the art—just as the corresponding mechanical operating temperature limiting devices—are always calibrated or adjusted to a fixed temperature limiting value and shut off the heating of the respective cooking zone, as soon as the set boundary or limiting value of the operating temperature, also the so-called shut-off temperature, has been reached.

These operating temperature limiting devices thus monitor the temperatures occurring in the cooking unit so that no impermissible change of the glass/glass-ceramic material occurs within the predetermined lifetime.

The usage frequency of the cooking unit differs from household to household according to different lifestyles. The above-mentioned standard for the operating frequency for safety of the user produces a comparatively high load with frequent cooking. In the current state of the art the given value for the operating frequency and the limiting value of the operating temperature determined from that lead to the disadvantage that the user who operates the cooking unit with reduced operating time cannot use the available permissible temperature/time load, i.e. the full potential of the cooking unit in regard to the ability of the glass/glass-ceramic cooking surface to withstand a load. It would be permissible for an operator who runs the cooking unit with reduced operating time to use a higher operating temperature for individual cooking events so that the cooking time for those individual events can be reduced.

If the user only uses an easy-to-use cooking utensil or if the utensil is empty, the given temperature/time load cannot be utilized. Also here the full potential of the glass-ceramic cooking surface cannot be used.

SUMMARY OF THE INVENTION

It is an object of the present invention to provide a method of adjusting a limiting or boundary value of the operating temperature of a cooking unit, whereby the full potential of the cooking unit to withstand a load on its glass/glass-ceramic cooking surface is better utilized, while still guaranteeing that the service life of the cooking unit is not reduced.

It is another object of the present invention to provide a device for performing the method of adjusting the limiting or boundary value of the operating temperature of the cooking unit, whereby the full potential of the cooking unit to withstand a load on its glass/glass-ceramic cooking surface is better utilized, while still guaranteeing that the service life of the cooking unit is not reduced.

The method according to the invention comprises the steps of:

a) measuring a cooking surface temperature and turned-on time of the cooking unit to obtain temperature and time value pairs during a respective usage time interval and calculating a cumulative actual temperature/time load value from these temperature and time value pairs and also a cumulative operating time value from the respective turned-on time of the cooking unit during the respective usage time interval of the cooking unit;

b) storing the respective cumulative temperature/time load value and the cumulative operating time value during operation of the cooking unit;

c) storing a predetermined sequence of temperature and time value pairs as a permissible temperature/time load for a predetermined usage frequency over a standard service life of the cooking surface;

d) comparing the cumulative temperature/time load value stored in step b) with the permissible temperature/time load stored in step c) for the respective cumulative operating time values during a predetermined time interval (comparison interval); and e) determining a limiting value for the operating temperature according to the comparing of step d) in order to obtain a permissible temperature/time load for the glass/glass-ceramic cooking surface for the given service life of the cooking unit.

The apparatus according to the invention comprises an operating temperature limiting means with adjustable operating temperature boundary or limiting value and at least one temperature sensor associated with it which measures the temperature in the heated cooking zone and a control unit for switching off the heating of the cooking zone when the limiting value of the operating temperature is reached, in which the operating temperature limiting means for adjusting the operating temperature limiting or boundary value includes a clock and a measurement and evaluation means for measuring, storing and comparing the temperature and time value pairs during respective usage time intervals and the turned-on time for each use required in the above-described method according to the invention.

The method and apparatus according to the invention have the advantage that they adjust the shut-off temperature for the operating temperature limiting means according to the usage frequency of the cooking unit. If the usage frequency is reduced in comparison to a standard guideline for the permissible load, a higher operating temperature can be permitted until the permissible standard load curve is reached. However the reverse is also true, namely that when the cooking unit is used very frequently, then the limiting value of the operating temperature must be reduced.

The energy or heat transferred to the cooking utensil on the cooking unit is increased by a higher operating temperature of the cooking surface, so that the cooking duration is advantageously shortened, without exceeding the permissible temperature/time load and thus guaranteeing that the service life of the cooking unit is not impaired.

In practice phases of frequent usage alternate with phases of reduced usage. After a phase of reduced usage the actual cumulative load is below that for the permissible maximum load at this time point. According to the method of the invention then in that situation the permissible limiting value for the operating temperature is increased. According to the usage frequency the permissible load curve is again reached sooner or later with this new temperature limit adjustment.

In rare or unusual cooking situations then as the need requires the method according to the invention advantageously provides a higher heating of the cooking utensils than the methods in the state of the art.

According to a preferred embodiment of the method the measured time/temperature value pairs are converted to equivalent temperature/time value pairs at a reference temperature and the temperature/time load thus determined is compared with the permissible temperature/time load at the reference temperature for the respective usage time interval during the cooking unit operation.

This embodiment of the method of the invention makes use of the characteristic property of the glass or glass/ceramic material forming the heating surface, after the real or actual temperature/time load is normalized to the reference temperature, whereby it is added or accumulated and can be compared with a maximum permissible load duration at this reference temperature.

For example the permitted load duration is 5000 h at 560° C. or 1000 h at 610° C. for the commercially available glass-ceramic CERAN®. A load of 1 h at 610° C. can be converted to an equivalent load of 5 h at the reference temperature of 560° C. and can be added to the already present load at this reference temperature.

Also the pre-stressing of a pre-stressed glass is lost by an excessive temperature/time load that is characterized by the temperature/time value pairs that can be related to an equivalent reference temperature.

Alternatively the operating temperature temperatures into fixed temperature intervals and the time intervals, in which the respective temperatures are reached, could be weighted differently.

Various embodiments of the method of the invention are possible according to the way in which the comparison time interval is determined. These embodiments are selected according to the desired frequency of adjustment of the limiting value of the operating temperature.

Thus according to a first embodiment of the invention the method is conducted so that the comparison time interval is determined according to individual cooking events. In this case an adjustment of the limiting value of the operating temperature occurs after each cooking event.

According to a second embodiment of the invention the method is conducted so that the comparison time interval is either a predetermined time interval or is determined by a number of individual cooking events. In this case the adjustment of the limiting value of the operating temperature occurs in the predetermined fixed time interval or after the several cooking events.

According to various embodiments of the invention the adjustment of the limiting value of the operating temperature can either take place continuously or by jumping between discrete values, wherein the first case is simpler.

In the simplest case according to one embodiment of the invention the method is conducted so that the permissible limiting value of the temperature is changed so that a linear behavior of the accumulated temperature/time load is obtained.

In the another embodiment of the invention the method is conducted so that the permissible limiting value of the temperature is changed so that a non-linear behavior of the accumulated temperature/time load is obtained, so that preferably initially in a first half of the service life an over-proportional usage of the permissible temperature/time load occurs.

This provides increased performance or heating by the cooking unit for the selected time interval. If the permissible load curve is exhausted in this time interval only a reduced heating power is available for the remaining portion of the service life. If this is not as stated in the above-described conventional operation, a high power is available from the beginning to the end of the usage.

The change of the limiting value of the operating temperature can be performed manually a using suitable load display device or automatically by means of an electronic unit. The later embodiment is preferable in practice to simplify the operation of the cooking unit, and also since automatic control is expensive.

BRIEF DESCRIPTION OF THE DRAWING

The objects, features and advantages of the invention will now be illustrated in more detail with the aid of the following description of the preferred embodiments, with reference to the accompanying figures in which:

FIG. 3 is a temperature/time load diagram including a load curve for an actual reduced operating frequency of the cooking unit and a standard load curve for normal operating frequency for comparison;

FIG. 4 is a temperature/time load diagram including an actual load curve with a reduced load according to an operating temperature limit determined by the method of the present invention in comparison to a similar load curve according to a conventional operating temperature limit determined by the known method;

DESCRIPTION OF THE PREFERRED EMBODIMENTS

Figure 1:
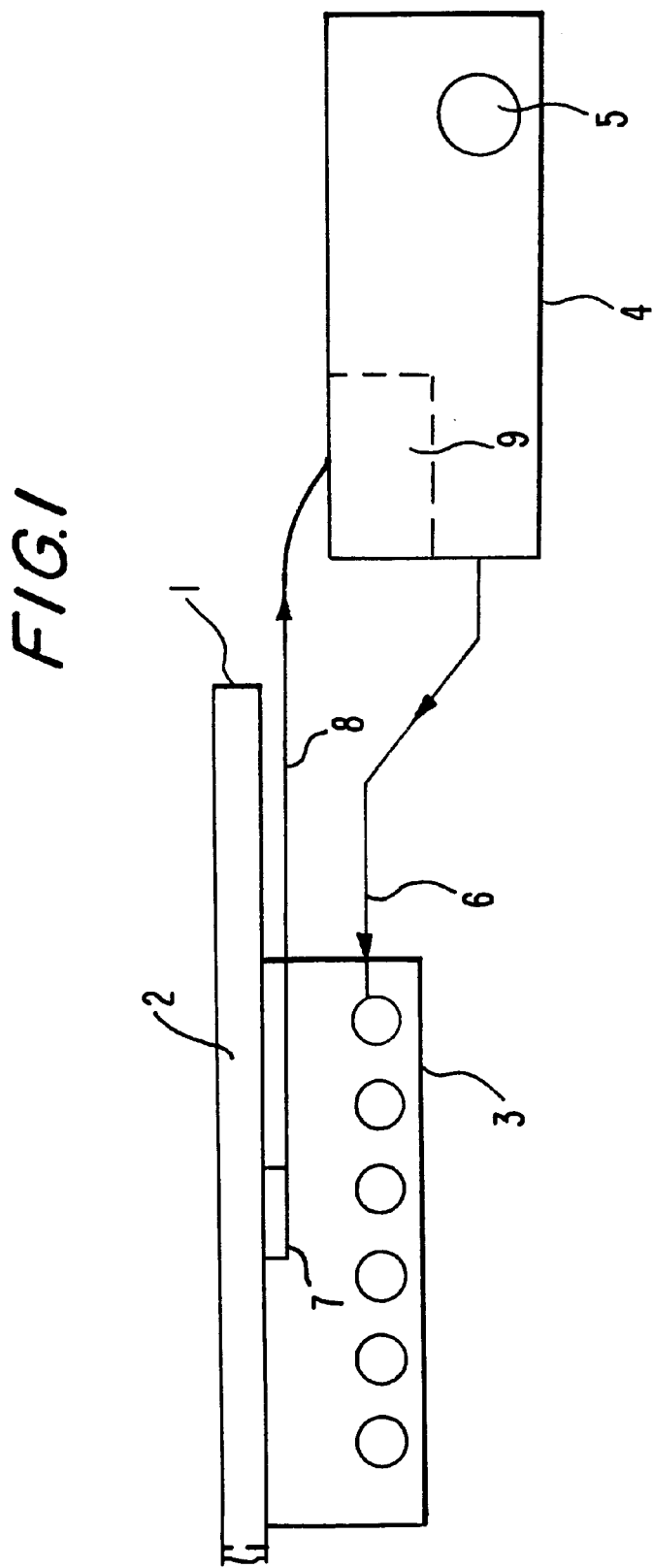
FIG. 1 is a schematic side view of a device for adjusting a limiting value of an operating temperature of a cooking unit with a glass-ceramic cooking surface according to the invention.

FIG. 1 shows a device or means for adjusting a limiting value of the operating temperature of a cooking unit, which has a glass/ceramic cooking surface 1 with at least one cooking zone 2, which is heated from below by means of an electrically heated body 3. The device or means for adjusting includes a controller 4 that has a conventional operating member 5 for adjustment of the heating power by means of the line 6.

A temperature sensor 7 is provided on the underside of the cooking zone 2, which is connected by means of the conductor 8 to the controller 4.

The features or structure of the controller 4 for adjusting or varying or shutting off the heating power are conventional. The temperature sensor 7 acts as an actual value giver for a controlled adjustment of the heating power.

The controller 4 includes an operating temperature limiting means 9 that acts to limit the operating temperature determined by the temperature sensor 7, in order to maintain temperature/time load on the glass/ceramic cooking surface 1 in the cooking zone 2 at the permissible value while reaching the corresponding limiting value of the operating temperature by shutting off the power to the electrically heated body.

The allowed temperature/time load over the service life of the glass/ceramic material is known to the manufacturer of the glass/ceramic as a material property. It is given as a temperature/time value pair. Similarly the behavior of the temperature/time load at other temperatures is also known. For the glass/ceramic material known by the trademark CERAN® the following temperature/time value pairs are obtained and is tabulated in the following Table I:

TABLE I

Temperature/Time Load for CERAN ©

| Temperature | Load duration |
| --- | --- |
| 560° C. | 5000 h or |
| 610° C. | 1000 h or |
| 660° C. | 100 h or |
| 710° C. | 10 h or |
| 760° C. | 5 h |

Based on this tabulated relationship between temperature and load duration it is possible to convert the load duration at an arbitrary temperature (e.g. 610° C. for 1 hour) into a load duration at a standard temperature (e.g. 5 h at 560° C.).

The known operating temperature limiting values are adjusted to limiting values that are selected so that during the guaranteed service life at respective operating frequencies the permissible temperature/time load on the glass/ceramic cooking surface 1 is not exceeded. A guideline for the permissible operating frequency is the above-mentioned published standard. The linear load curve resulting therefrom is shown with dashed lines in the load diagram of FIG. 3. The CERAN® glass/ceramic material has a service life of 5000 h at 560° C. However if the temperature/time load is less than the published standard due to reduced operating frequency, then the load curve is lower than the "normal load curve", as the solid curve line in FIG. 3 shows for example. In this case the full potential load limiting value cannot be reached during the guaranteed service life.

This disadvantage is avoided by the method according to the invention. This method adjusts or varies the limiting value of the operating temperature according to the usage frequency.

Furthermore the operating temperature limiting means or part 9 of the controller 4 includes clock, memory and processor stages. These devices are advantageously provided by parts of a program of a microprocessor.

Figure 2:
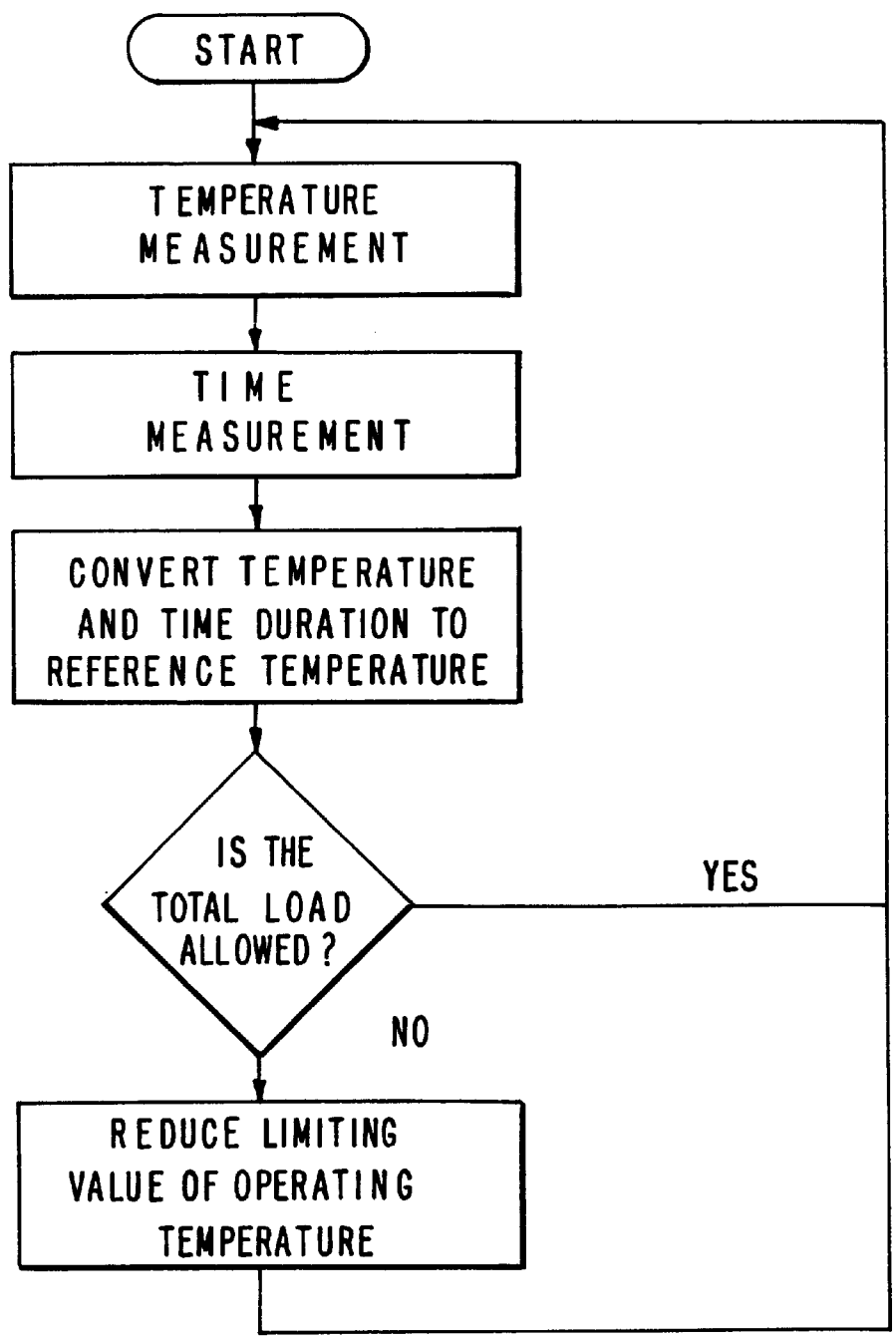
FIG. 2 is a flow chart of the basic steps for the method of operating the device shown in FIG. 1 to determine the limiting value of the operating temperature.

According to the flow chart shown in FIG. 2 the method begins with a program start activated by turning on the heated body 3 and then proceeds by measuring the glass/ceramic temperature in the respective cooking zone by means of the temperature sensor 7 and measuring the duration of the temperature load. The measured time/temperature value pair, i.e. the load on the glass/ceramic material, is now converted to the equivalent load temperature, in the above example the load at 560° C., according to the above-given Table and that value of the load is stored in the controller 4. The loads during the individual cooking events are accumulated or added to give the actual total load that is stored in the memory. The operating time since putting the cooking unit in operation is logged in the memory. Whether or not the limiting value of the operating temperature must be recalculated or recycled, so that the load increases slower, or whether or not the limiting value for the operating temperature can be increased, is determined for the actual operating time interval by comparing the measured actual load with the permissible load stored as actual value pairs according to the dashed curve in FIG. 3. Since in the in the example of FIG. 3 the actual cumulative load at 2500 h after half the service life is less than the value A, the limiting value of the operating temperature can be increased.

Only the cumulative load and the time since being put into operation are stored as data during operation; storage of the entire history of the cooking process is not required. The values for the permissible load are predetermined and fixed for the entire service life.

A greatly advantageous reduction of the cooking time by about 25% is possible by raising the limiting value of the operating temperature about 50 K with other conditions equal.

After a phase of reduced operating frequency (for example shown by the time interval T in the load curve according to FIG. 4) a higher shut-off temperature can be allowed, until the load again approaches the predetermined load according to the "normal" load curve (dashed line in FIG. 4). The actual load curve in FIG. 4 would be under the "normal" load curve with a conventional temperature limiting device or controller with a fixed shut-off temperature.

Figure 5:
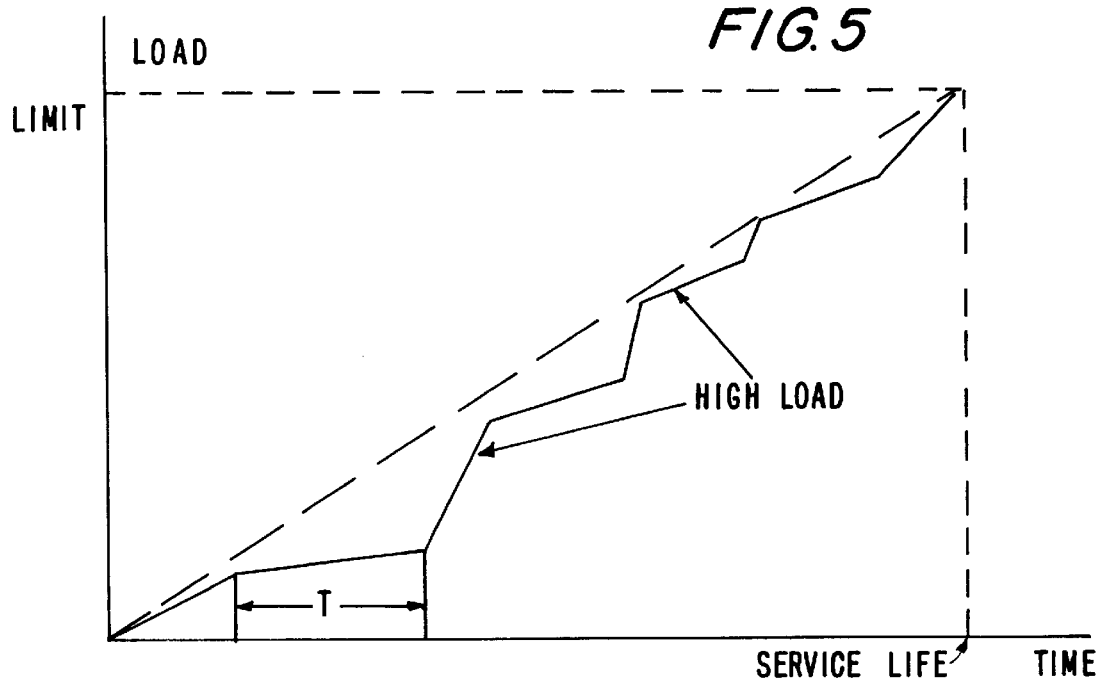
FIG. 5 is a temperature/time load diagram showing the behavior of the load curve with varying loads.

In practice phases of frequent usage alternate with those of reduced usage, as shown in FIG. 5 with the aid of the solid line indicating this type of load curve. After a phase T of reduced usage the actual cumulative load is below the permissible load at this time point in the service life, which is shown with the dashed curve in FIG. 5. This is determined by the controller 4 according to the invention, which then increases the permissible shut-off temperature. The permissible load curve is then reached sooner or later according to the usage frequency.

Thus a higher heating power or better cooking performance for the system according to the invention than the state of the art results when the cooking unit is only rarely used in comparison to the normal usage guideline.

Figure 6:
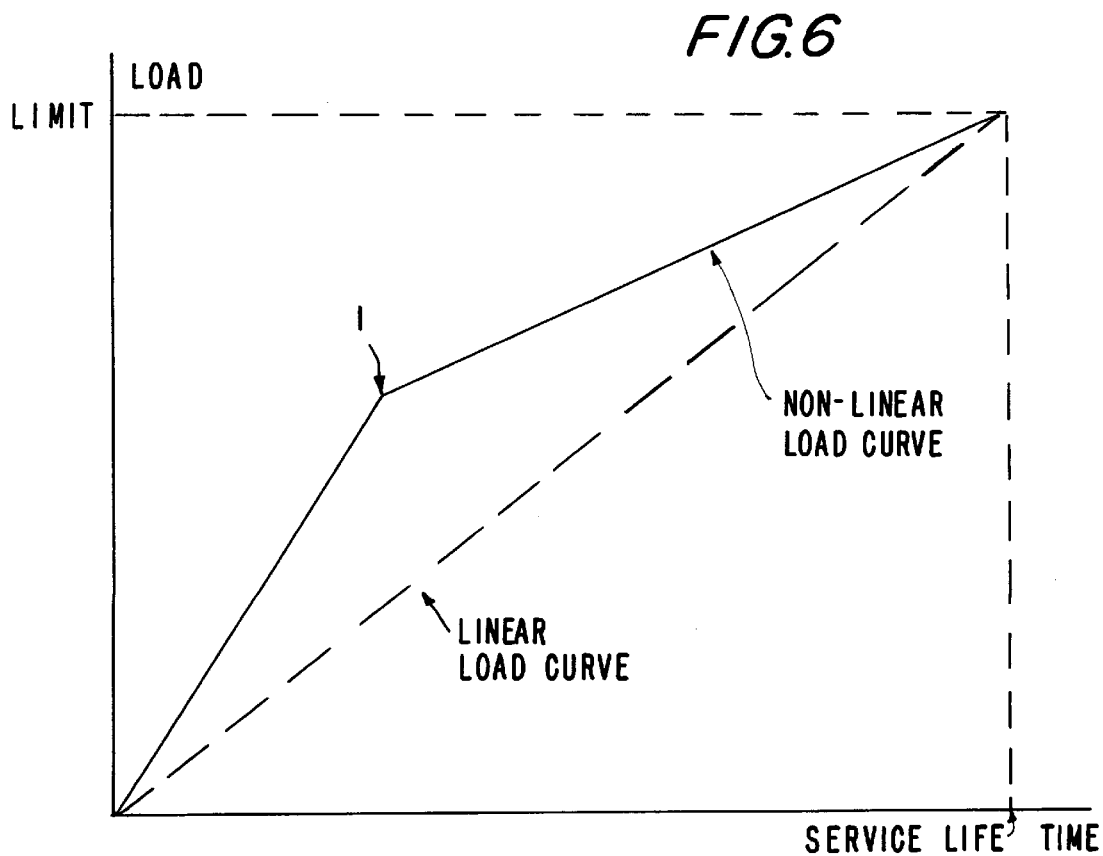
FIG. 6 is a temperature/time load diagram showing an adjustment of a non-linear load curve by a corresponding change of the limiting value of the operating temperature in comparison to a linear load curve.

In another embodiment according to the invention the cumulative load curve, as shown in FIG. 6, is non-linear, preferably steeper at the beginning. This permits increased performance or power for the cooking unit during the selected time interval. If the permissible load curve (shown with dashed lines) according to the standard guideline is exhausted in this time interval however, only reduced performance or power is available for the remaining part of the service life. When it is not as stated in the above-mentioned conventional practice, a high power is available from the beginning to the end of the operating time.

A maximum value (safety limit) for the limiting value of the temperature is determined, which establishes or determines the maximum increase of the actual load curve. Excessively high temperatures arising in the system, which can lead to damage of the components of the cooking unit, cooking vessels or surrounding furniture, are prevented by this feature of the method. If this safety limit is however a fixed value, then the resulting load would be higher than that which is permissible over the service life.

Typically a limiting value of the temperature of the operating temperature limiting means 9 is increased to achieve a higher shut-off temperature. If the permissible shut-off temperature is not reached, then the power to the heated body 3 is increased as needed in order to utilize the increased shut-off temperature.

In the embodiment shown in the drawing an electrically heated body 3 is provided. However embodiments of the method and device according to the invention for gas heating under the cooking surface are similar.

According to German Patent Document DE 37 39 943 an operating temperature limiting device adjusted to a fixed temperature similar to the state of the art is built into a conventional aggregate cooking plate with a pre-stressed glass plate in order to protect the system from loss of pre-stressing of the glass plate. Also high temperatures which lead to losses of pre-stressing occur in the vicinity of the burners with open gas burners in openings of the pre-stressed glass plates, if they occur over the entire service life. This is also true for electrical heating by induction coils and a cooking surface made from pre-stressed glass. Assuming a predetermined usage frequency and with the known behavior of the loss of the pre-stressing (e.g. 290° C./1000 h; 300° C./100 h) the fixed adjustment of the protective limiting temperature is selected in the previously known cases.

With reduced use in comparison to the above-mentioned usage frequency the operating temperature limit is increased by the invention, whereby in a few cases the operating temperature limiting means or device of the cooking unit turns off the cooking unit.

The disclosure in German Patent Application 198 51 029.2 of Nov. 5, 1998 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a method for adjusting a limiting value of an operating temperature of a cooking unit and device for performing the method, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims:

1. A method for adjusting a limiting value of an operating temperature of a cooking unit, said cooking unit comprising a glass or glass-ceramic cooking surface with at least one heated cooking zone, said method comprising the steps of:
   a) measuring a cooking surface temperature and a turned-on time of the cooking unit to obtain temperature and time value pairs during a respective usage time interval and calculating a cumulative temperature/time load value from said temperature and time value pairs and a cumulative operating time value since setting the cooking unit into operation from the turned-on time during said respective usage time interval;
   b) storing the cumulative temperature/time load value and the cumulative operating time value;
   c) storing a predetermined sequence of temperature and time value pairs and determining a permissible temperature/time load for a given usage frequency over a standard service life of the cooking surface from the temperature and time value pairs;
   d) comparing the cumulative temperature/time load value stored in step b) with the permissible temperature/time load stored in step c) for the respective cumulative turned-on time for a predetermined comparison time interval; and
   e) determining the limiting value of the operating temperature according to the comparing of step d), whereby an actual temperature/time load for the glass or the glass/ceramic cooking surface over the standard service life of the cooking unit that is permissible is obtained.

2. The method as defined in claim 1, further comprising converting said temperature and time value pairs for said cumulative temperature/time load obtained during said respective usage time intervals to equivalent temperature and time value pairs at a reference temperature and comparing the cumulative temperature/time load so determined with said permissible temperature/time load at said reference temperature for said cumulative turned-on time since putting the cooking unit in operation.

3. The method as defined in claim 1, wherein the predetermined comparison time interval is determined by an individual cooking event.

4. The method as defined in claim 1, wherein the predetermined comparison time interval is a predetermined time interval.

5. The method as defined in claim 1, wherein the predetermined comparison time interval is determined by a predetermined plurality of cooking events.

6. The method as defined in claim 1, wherein the limiting value of the operating temperature is high in comparison to other operating temperatures that are permissible for the cooking unit.

7. The method as defined in claim 1, wherein the limiting value of the operating temperature is such that said cumulative temperature/time load on the cooking surface varies linearly with operating time.

8. The method as defined in claim 1, wherein the limiting value of the operating temperature is such that said cumulative temperature/time load on the cooking surface varies in a non-linear manner with operating time so that during a first portion of the service life an over-proportional use of the permissible temperature/time load occurs.

9. The method as defined in claim 1, wherein the limiting value of the operating temperature only takes discrete temperature values at fixed temperature intervals.

10. The method as defined in claim 1, wherein the limiting value of the operating temperature varies continuously according to a deviation of the accumulated temperature/time load from the permissible temperature/time load.

11. The method as defined in claim 1, wherein the cumulative temperature/time load and the permissible temperature/time load for said cumulative turned-on time are displayed to an operator of the cooking unit and the limiting value of the operating temperature is manually set by the operator according to observation of the cumulative temperature/time load and the permissible temperature/time load.

12. The method as defined in claim 1, wherein the limiting value of the operating temperature is automatically set according to the comparing of the cumulative temperature/time load and the permissible temperature/time load for said cumulative turned-on time.

13. An apparatus for adjusting a limiting value of an operating temperature of a cooking unit, said cooking unit comprising a glass or glass-ceramic cooking surface with at least one heated cooking zone, said apparatus comprising a controller (4) comprising means for shutting-off the heating of the cooking zone (2) when the limiting value of the operating temperature is reached; and means (9) for determining the limiting value of the operating temperature, said means for determining the limiting value including means (7) for measuring a cooking surface temperature and means for measuring a turned-on time of the cooking unit to obtain temperature and time value pairs during respective usage time intervals;

means for calculating a cumulative actual temperature/time load value from these temperature and time value pairs and also a cumulative operating time value from the turned-on time of the cooking unit during said respective usage time intervals;

means for storing the cumulative temperature/time load value and cumulative operating time value since putting the cooking unit into operation;

means for storing a predetermined sequence of temperature and time value pairs and determining a permissible temperature/time load for a given frequency over a standard service life of the cooking surface from the temperature and time value pairs;

means for comparing the cumulative temperature/time load value stored in step b) with the permissible temperature/time load stored in step c) for the respective cumulative turned-on time for a predetermined comparison time interval; and means for determining the limiting value of the operating temperature according to the comparing of step d), whereby an actual temperature/time load for the glass or the glass/ceramic cooking surface over the standard service life of the cooking unit that is permissible is obtained.

14. The apparatus as defined in claim 13, further comprising means for converting the respective temperature/time value pairs for said cumulative temperature/time load into equivalent temperature/time pairs at a reference temperature.

15. The apparatus as defined in claim 13, further comprising a counter for counting a plurality of cooking events and for determining a comparison time interval.

16. The apparatus as defined in claim 13, comprising a microprocessor including a memory, clock device and comparison means.

* * * * *